May 13, 1958 T. T. BROWN 2,834,887
CONTROL SYSTEMS FOR MATCHING IMPEDANCE NETWORKS
Filed Oct. 31, 1955 2 Sheets-Sheet 1

INVENTOR:
Thomas Theodore Brown
BY: Baldwin & Wight
ATTORNEYS

May 13, 1958 T. T. BROWN 2,834,887
CONTROL SYSTEMS FOR MATCHING IMPEDANCE NETWORKS
Filed Oct. 31, 1955 2 Sheets-Sheet 2

INVENTOR:
Thomas Theodore Brown
BY: Baldwin & Wight
ATTORNEYS

United States Patent Office 2,834,887
Patented May 13, 1958

2,834,887

CONTROL SYSTEMS FOR MATCHING IMPEDANCE NETWORKS

Thomas Theodore Brown, Epping, England, assignor to Marconi's Wireless Telegraph Company Limited, London, England, a British company Application October 31, 1955, Serial No. 543,975

Claims priority, application Great Britain November 18, 1954

2 Claims. (Cl. 250—40)

This invention relates to automatic control systems for impedance matching networks such as are commonly employed for coupling a so-called self-tuning radio transmitter to its associated aerial.

Figure 1:
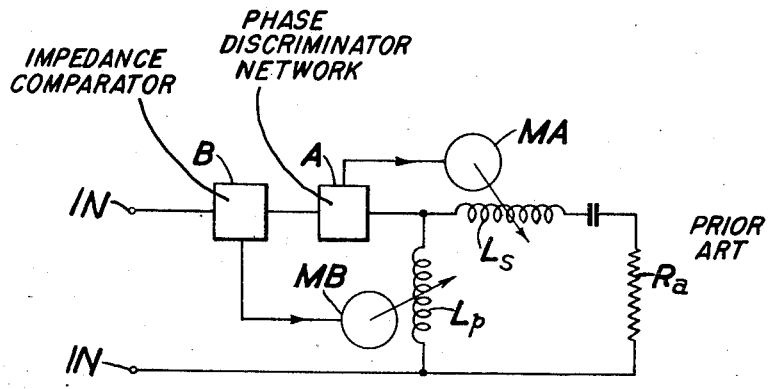
Figure 2:
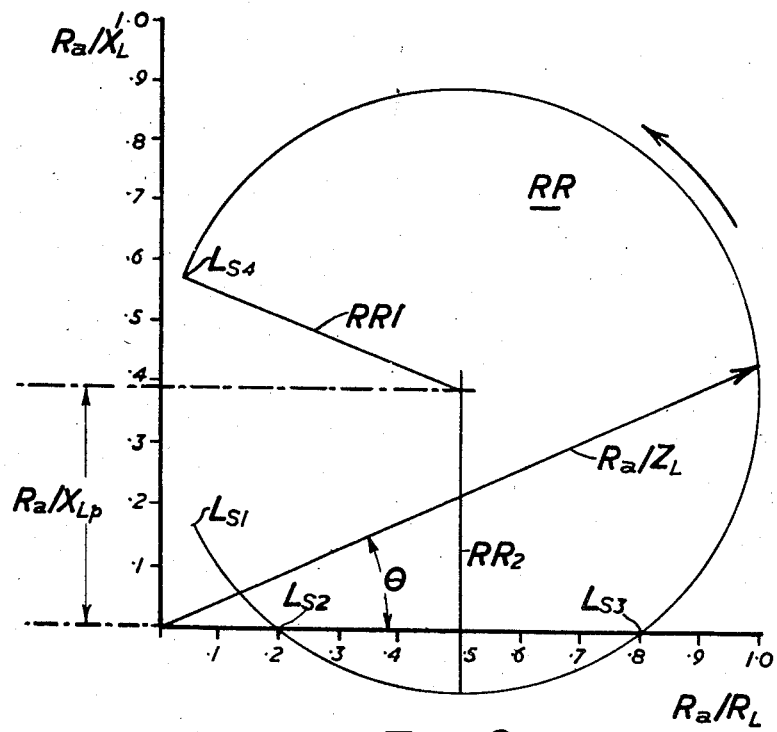
Figure 4:
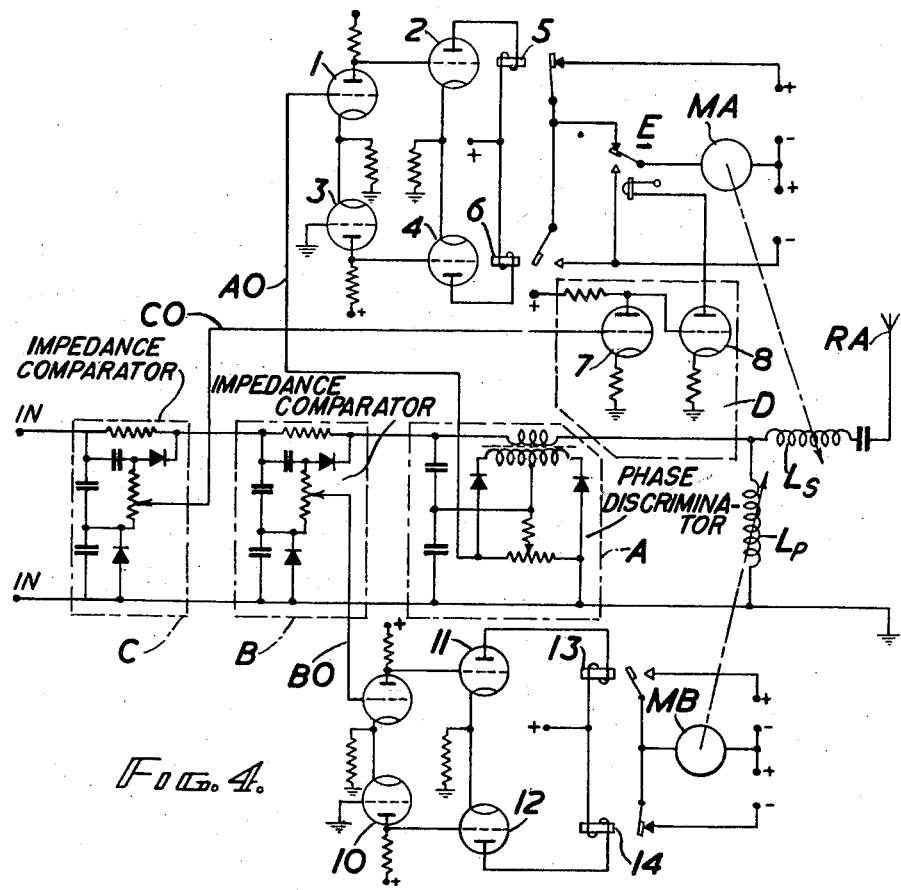
Figure 3:
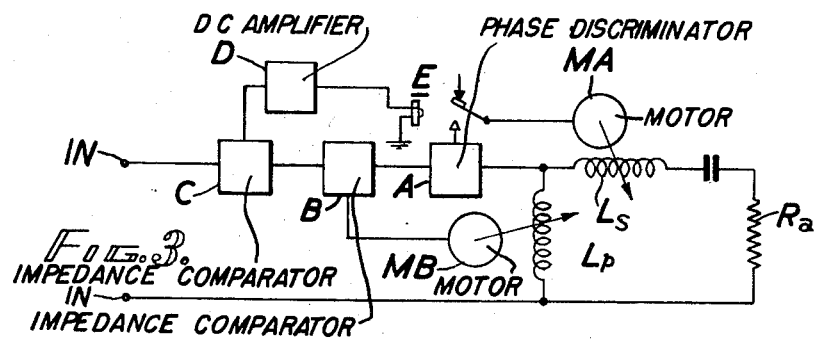

The invention is illustrated in and explained in connection with the accompanying drawings in which Fig. 1 is a block diagram of a typical known automatic control system; Fig. 2 is a graphical figure illustrating a defect of the known system of Fig. 1; Fig. 3 is a block diagram, much simplified, of one embodiment of the invention; and Fig. 4 shows the arrangement of Fig. 3 in more detail.

Referring to Fig. 1 a transmitter (not shown) connected at terminals IN, is coupled to its load, usually an aerial but represented by a resistance $R_a$ through a variable impedance matching network shown as of the $\pi$ type and comprising a series variable inductance $L_s$ which is adjusted to maintain resonance that is by a tuning control, and a shunt variable inductance $L_p$ which is adjusted to maintain impedance matching with a selected value of load resistance, such as 50 ohms to quote a practical figure. Each of these inductances is automatically adjusted by its own adjusting motor MA or MB, the tuning control motor MA being controlled by a suitable phase discriminator network A and the impedance matching adjustment control motor MB being controlled by a suitable impedance comparator B. The phase comparator A compares its input and output phases and so long as the relative phase condition is not that appropriate to resonance, provides a direct current output dependent on the departure from the resonance condition to control the motor MA to run in the direction necessary to restore resonance. Similarly the impedance comparator B compares its input and output impedances and provides a control DC to run the motor MB to obtain and maintain the matched impedance condition.

This known system has a defect which will be explained in connection with Fig. 2 and which arises from the fact that all impedance matching networks have more than one frequency of resonance, that is for any given frequency from the transmitter there will be two values of adjustment of inductance $L_s$ that will provide resonance. At only one of these, however, will correct impedance matching be obtained, the other giving an unmaintainable overloaded condition. The location of the two resonance points is shown in Fig. 2 which is a locus diagram of input admittance of the impedance network for variations of the value of the inductance $L_s$ over a complete range from $L_{s1}$ to $L_{s4}$. In Fig. 2 the ratio of load resistance $R_a$ to input reactance $X_L$, that is the reactive impedance component at terminals 1, is plotted against the ratio of load resistance $R_a$ to input resistance $R_L$, that is the resistive impedance component at terminals IN, for a few selected values of the inductance $L_s$. The locus of these points lies on a circle and the required values of $L_s$ which give resonance are the points $L_{s2}$ and $L_{s3}$ where the circle cuts the $R_a/R_L$ axis. These points also give the two corresponding values of input reactance. The normally useful point is the left hand one $L_{s2}$, the right hand point $L_{s3}$ corresponding to the overloaded condition when the Q value of the circuit is less than unity. For any particular value of $L_s$ the impedance as seen by the impedance comparator B is given by the vector $R_a/Z_L$ where $Z_L$ is the impedance at terminals IN, and the phase angle as seen by the phase discriminator A is given by the angle $\theta$. In Fig. 2 the quantity $X_{Lp}$ is the reactive impedance component of the inductance $L_p$.

Suppose now the motor MA runs to vary the impedance $L_s$ from $L_{s1}$ through $L_{s2}$ and $L_{s3}$ to $L_{s4}$. From $L_{s1}$ to $L_{s2}$ the phase angle as seen by the phase discriminator A is lagging; at $L_{s2}$ (the desired condition) the angle is zero; from $L_{s2}$ to $L_{s3}$ the phase angle is leading; at $L_{s3}$ it is again zero (the unwanted resonance position); and from $L_{s3}$ to $L_{s4}$ it lags once more. Accordingly if the control of the motor MA is such as to reduce the value of inductance $L_s$ for a lagging phase angle (as seen by the discriminator) and to increase it for a leading angle, once the system reaches an operating point between $L_{s3}$ and $L_{s4}$ the motor MA will be controlled to run in the wrong direction, that is, to increase the inductance $L_s$ instead of reducing it. The control system is then completely disabled. It is not possible practically to avoid this trouble by providing a mechanical limit to the range of adjustment of inductance $L_s$ because the points $L_{s2}$ and $L_{s3}$ may be anywhere on the length of the inductance, depending on the frequency and on the load. Also, in practice, the points $L_{s2}$ and $L_{s3}$ tend to be close together physically—often only about one or two turns apart on a typical 20 turn inductance coil $L_s$—and accordingly inertia effects in the motor MA may easily cause overshotting into the $L_{s3}$—$L_{s4}$ region. The object of the present invention is to avoid the foregoing defect of liability to incorrect operation.

The invention utilizes a property of the impedance matching network which can also be seen from Fig. 2. This property is that, so long as the value of $L_s$ brings operation within what may be termed the "region of reversal" that is, in the area RR of the circle between the radii RR1 and RR2, vector $R_a/Z_L$ is over 0.5 and the input impedance is always substantially less than the required load, assumed, for the sake of example, to be 50 ohms. The values of aerial resistance that would normally be matched by the network must be below $\frac{1}{2}R_L$, that is, 25 ohms. If above this they are in practice effectively reduced by adding capacity in parallel with the aerial in the usual way. Suppose, for example, that the range of the vector over the region of reversal $R_a/Z_L$ is from 0.5 to 1.2 so that if the aerial resistance is 10 ohms the input impedance varies from $R_a/0.5=20$ ohms to $R_a/1.2=8.4$ ohms—both well below the 50 ohms load required. If, therefore, the arrangement is made such that, so long as the input impedance is below a predetermined value, for example 45 ohms, such that operation is taking place in the region of reversal, the direction of rotation of the tuning control motor as determined by the phase discriminator is reversed, the said motor will run in the direction to take the tuning outside the region of reversal back into the proper region and, when in consequence the input impedance rises above the said predetermined value, the phase discriminator will once more alone determine the direction of motor travel as in the ordinary way.

According to this invention, therefore, an automatic control system for an impedance matching network having at least two adjustable elements, one for tuning control and the other for impedance matching control, comprises two impedance comparators and a phase discriminator, adjustment means for each of said elements, means controlled by said phase discriminator for adjusting the adjustment means for the tuning control element in response to departures from the resonant condition and in a direction to restore said condition, means controlled by one impedance comparator for adjusting the adjustment means for the matching control in response to departures from the matched condition and in a direction to restore said matched condition, and means controlled by the other impedance comparator in response to the occurrence of an input impedance of said network below a pre-determined value which is substantially less than that for the matched condition, for reversing the direction of adjustment of the tuning control element as determined by the phase discriminator.

Fig. 3 is a highly simplified block diagram drawn in the same manner as the block diagram of Fig. 1 but showing an embodiment of this invention. The inductances $L_s$ and $L_p$ are adjusted respectively by the motors MA and MB as in Fig. 1 and these motors are respectively controlled by a phase discriminator A and an impedance comparator B. In addition, however, there is provided another impedance comparator C, the output of which, after amplification in a suitable D. C. amplifier D controls a relay E having contacts which can introduce a reversal of the direction of rotation of the motor MA with respect to the direction that would othewise be produced by the phase discriminator A. The impedance comparator C is so adjusted that if the input impedance is below a pre-determined value, that is to say if the input impedance is at a value corresponding to operation in the region of reversal, the relay E is operated so as to override as regards direction of running of the motor MA, the direction control imposed by the phase discriminator A. Accordingly the said motor will adjust the inductance $L_s$ to bring the apparatus back into the required region of operation whereupon the relay E will release and the phase discriminator A take direct charge in the normal way.

Fig. 4 shows the arrangement of Fig. 3 in more detail. In Fig. 4 the load is shown as an aerial RA and the two impedance comparators C, B of Fig. 3 are shown within the correspondingly marked chain line blocks. These devices are as known per se and require no specific description herein. The output of the phase discriminator A is fed along lead AO and after amplification in a D. C. amplifier comprising valves 1, 2, 3 and 4 operates one or other of two relays 5 and 6 in dependence upon whether the tuning adjustment at the moment is one giving a lagging phase angle or a leading phase angle. The relays 5, 6 operate in effect as reversing relays for the motor MA controlling the polarity of the energization thereof in manner which will be obvious from the diagram. It will be noted, however, that the control circuit for the motor MA includes a relay E and that in one position of the relay E operation of relay 5 will produce rotation of the motor MA in one direction, while in the other position of the relay E operation of the relay 5 will produce rotation in the opposite direction. Similarly the relay E will reverse the direction of rotation produced by operation of the relay 6 so that in effect the relay E is an overriding direction controlling relay overriding the direction control effected by the relays 5, 6. The relay E is actuated by the output from the first impedance comparator C taken along the lead CO and amplified in a D. C. amplifier D including the valves 7, 8. The impedance comparator C is so adjusted that if the input impedance is below a predetermined minimum such that the region of reversal has been entered the motor MA will be run in a direction to adjust the inductance $L_s$ to a value which brings the input impedance above that predetermined minimum. The impedance comparator B effects control of the inductance $L_p$ by means of the motor MB in manner known per se, the said output being taken via lead BO and after amplification in D. C. amplifiers comprising the valves 9, 10, 11 and 12 employed to operate one or other of two relays 13, 14 controlling the polarity of energization of the motor MB.

The impedance comparator circuits are constituted by resistive circuits in which impedance is the ratio of voltage to current, so that the term "discriminator" is used in the claims to emphasize the fact that the deflection obtained is definitely proportional to the magnitude of the impedance.

While I have described my invention in certain preferred embodiments I realize that modifications may be made and I desire that it be understood that no limitations upon my invention are intended other than may be imposed by the scope of the appended claims.

I claim:

1. An automatic control system for an impedance matching network having at least two adjustable elements, comprising two impedance comparators and a phase discriminator, adjustment means for each of said elements, means controlled by said phase discriminator for adjusting the adjustment means for one of said elements for tuning said element in response to departures from a resonant condition and in a direction to restore said condition, means controlled by one impedance comparator for adjusting the adjustment means for the other of said elements for matching said last mentioned element in response to departures from a matched condition and in a direction to restore said matched condition, and means controlled by the other impedance comparator in response to the occurrence of an input impedance of said network below a predetermined value which is substantially less than that for the matched condition, for reversing the direction of adjustment of said first mentioned element as determined by the phase discriminator.

2. In combination, a source of high frequency energy; a load; a variable tuning adjusting inductance in series with said load; a variable impedance matching inductance in parallel with said load, two electric motors, one coupled mechanically to one of said inductances, and the other coupled mechanically to the other of said inductances, to vary the same; an impedance comparator and a phase discriminator in the series circuit between said source and said load, the phase discriminator being responsive to the relation between its input and output phases and being connected to control the motor coupled to the tuning inductance to maintain the same automatically at the value appropriate to the resonance condition and the impedance comparator being responsive to the relation between its input and output impedances and being connected to control the motor coupled to the impedance matching inductance to maintain the same automatically at the value appropriate to the matched impedance condition; a further impedance comparator preceding the first mentioned impedance comparator and the said phase discriminator in the said series circuit; and means, controlled by said further impedance comparator, for reversing the direction of running of the tuning inductance varying motor as determined by said phase discriminator when the input impedance of said further comparator falls below a pre-determined value.

References Cited in the file of this patent

UNITED STATES PATENTS

| | | |
|---|---|---|
| 2,376,667 | Cunningham et al. | May 22, 1945 |
| 2,458,684 | Crandell | Jan. 11, 1949 |